(12) United States Patent
Igarashi et al.

(10) Patent No.: US 7,349,390 B2
(45) Date of Patent: Mar. 25, 2008

(54) PACKET TRANSMISSION METHOD AND COMMUNICATION SYSTEM

(75) Inventors: Ken Igarashi, Yokohama (JP); Yugo Watanabe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1044 days.

(21) Appl. No.: 10/445,350

(22) Filed: May 27, 2003

(65) Prior Publication Data
US 2003/0223422 A1 Dec. 4, 2003

(30) Foreign Application Priority Data
May 28, 2002 (JP) ............................. 2002-154608

(51) Int. Cl.
*H04Q 7/38* (2006.01)
(52) U.S. Cl. ................ 370/390; 370/432; 370/331
(58) Field of Classification Search ........... 370/401, 370/230, 235.1, 254, 356, 392, 386, 410, 370/310.1, 328, 390, 432, 331, 332
See application file for complete search history.

(56) References Cited

U.S. PATENT DOCUMENTS

| 6,473,411 | B1* | 10/2002 | Kumaki et al. | 370/331 |
|---|---|---|---|---|
| 6,614,797 | B1* | 9/2003 | Hippelainen | 370/410 |
| 6,721,318 | B1* | 4/2004 | Cai et al. | 370/390 |
| 6,822,947 | B2* | 11/2004 | Sawyer et al. | 370/328 |
| 7,088,992 | B2* | 8/2006 | Yasue et al. | 455/412.1 |
| 7,170,898 | B2* | 1/2007 | Yabe et al. | 370/401 |
| 7,187,666 | B1* | 3/2007 | Farley et al. | 370/331 |
| 7,200,398 | B1* | 4/2007 | Xu et al. | 455/436 |
| 7,215,948 | B2* | 5/2007 | Tsukagoshi | 455/414.2 |

(Continued)

FOREIGN PATENT DOCUMENTS

EP 0 566 551 10/1993

(Continued)

OTHER PUBLICATIONS

H. Balakrishnan, et al., MOBICOM, Proceedings of the Annual International Conference on Mobile Computing and Networks, XP-002150717, pp. 1-19, "Improving Reliable Transport and Handoff Performance in Cellular Wireless Networks", Nov. 14, 1995.

(Continued)

*Primary Examiner*—Chirag G. Shah
*Assistant Examiner*—Ankit P Gandhi
(74) *Attorney, Agent, or Firm*—Oblon, Spivak, McClelland, Maier & Neustadt, P.C.

(57) ABSTRACT

The object is to prevent occurrence of packet loss in Cellular IP and a drop of TCP throughput due to duplication of packets. On the occasion of relaying a packet from correspondent, a relay router multicasts a router advertisement to access routers forming respective cells into which a target mobile terminal might move. The mobile terminal receives the router advertisements from the neighbor access routers, calculates a difference between reception times of the packets from the respective access routers, and specifies a relay router to perform multicasting. Then the mobile terminal transmits delay information of a delay to be added to each path in multicasting by the relay router, to the relay router thus specified. The relay router adds the delay to each path in multicasting on the basis of the delay information.

6 Claims, 9 Drawing Sheets

U.S. PATENT DOCUMENTS

2002/0007414 A1    1/2002    Inoue et al.

FOREIGN PATENT DOCUMENTS

| WO | WO 94/30024 | 12/1994 |
|----|-------------|---------|
| WO | WO 00/57664 | 9/2000  |
| WO | WO 01/17157 | 3/2001  |

OTHER PUBLICATIONS

M. Mouly, et al., Cell & Sys. Correspondence, XP-002254397, pp. 336-339, 424-429, "GSM-The System for Mobile Communications", Mar. 30, 1999.

* cited by examiner

PACKET TRANSMISSION METHOD AND COMMUNICATION SYSTEM

BACKGROUND OF THE INVENTION

1. Field of the Invention

The present invention relates to a communication system and a packet transmission method, and more particularly, to a communication system comprised of a mobile terminal, a plurality of access routers, each access router forming a cell and configured to perform radio communication with a mobile terminal located in the cell, and a plurality of relay routers connected to a hierarchical structure above the access routers, and a packet transmission method applied in the communication system when a packet from a packet source is transmitted from an upper layer in the communication system toward a target mobile terminal.

The mobile terminal generally represents every portable terminal equipment including cellularphones, PHSs, PDAs, portable personal computers, and so on, and the access routers are routers with the base station function, such as radio interfaces and the like.

2. Related Background Art

It is known in the field of mobile telecommunications that packet loss occurs during handover in which a mobile terminal migrates between access routers. In Cellular IP described in Internet Draft, a relay router (e.g., a cross over router (COR)) temporarily multicasts packets to both an original access router and a new access router during handover, thereby decreasing packet loss during handover.

Figure 1A:
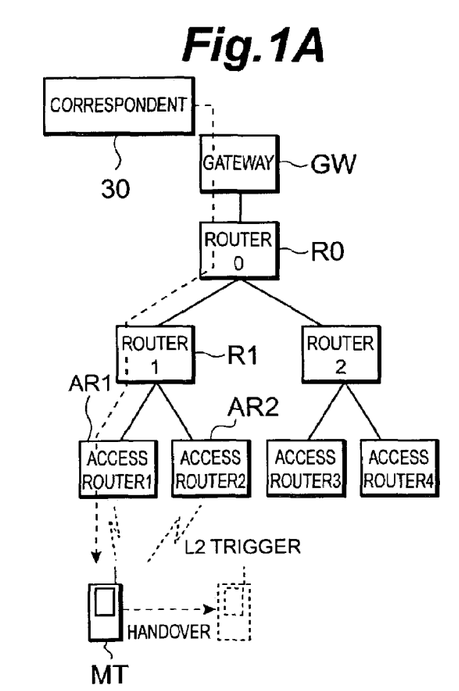
FIG. 1A is an illustration for explaining the multicast handover in Cellular IP which shows a view indicating the operation wherein the mobile terminal acquires the information about the new access router AR2 from the link layer information.
Figure 1B:
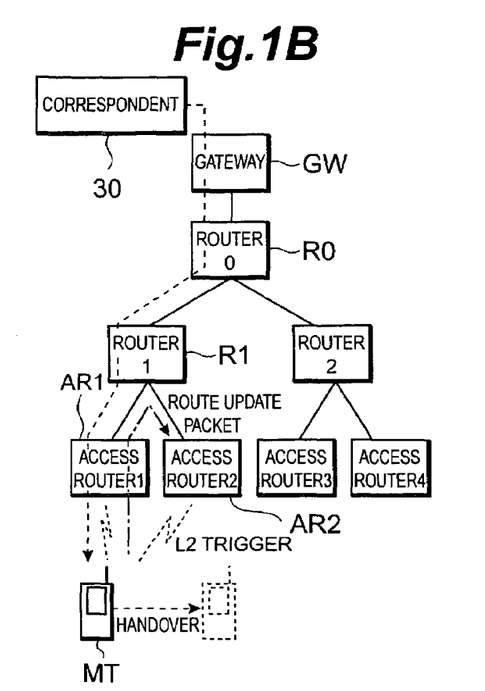
FIG. 1B is an illustration for explaining the multicast handover in Cellular IP which shows a view indicating the operation wherein the mobile terminal transmits the route update packet for multicast handover to the new access router AR2.

The multicast handover in Cellular IP will be described below with reference to FIGS. 1A-1D. In the multicast handover, as shown in FIG. 1A, a mobile terminal MT first acquires information about an access router AR2 as a destination of movement on the basis of Link Layer information during communication with an access router AR1 being an original access router before movement. Then, as shown in FIG. 1B, the mobile terminal MT transmits a route update packet for multicast handover via the original access router AR1 to the new access router AR2 whose information was acquired above. Thereafter, a relay router R1 receives the route update message for multicast handover.

Figure 1C:
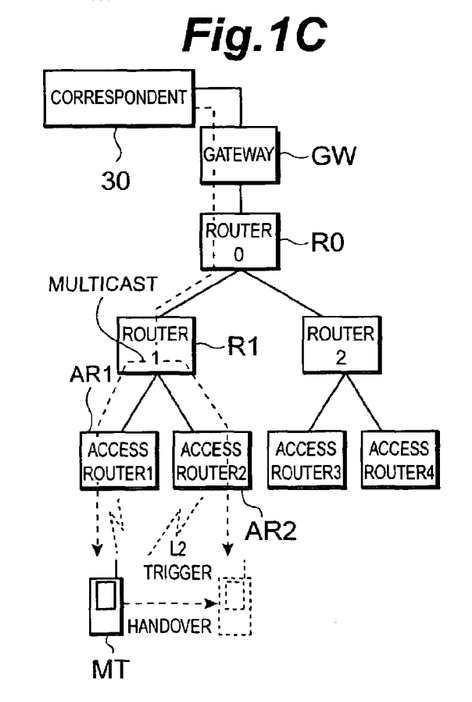
FIG. 1C is an illustration for explaining the multicast handover in Cellular IP which shows a view indicating the operation wherein the relay router R0 multicasts packets to the access routers AR1, AR2.
Figure 1D:
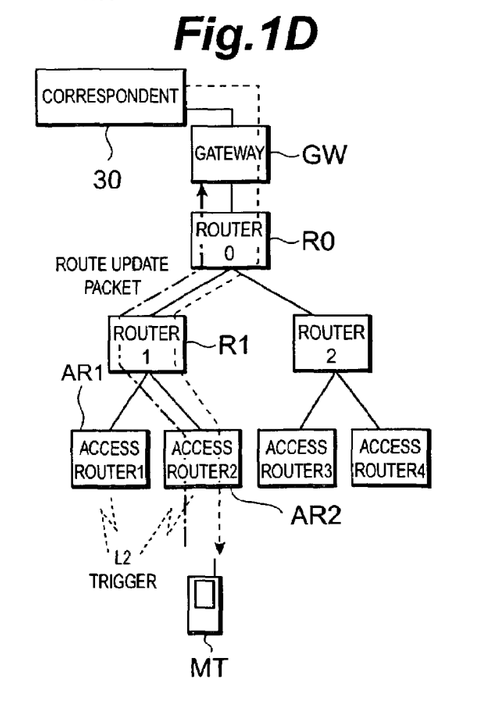
FIG. 1D is an illustration for explaining the multicast handover in Cellular IP which shows a view indicating the operation wherein the mobile terminal sends the route update packet to the gateway.

Then the relay router R1 receiving the route update message for multicast handover, multicasts packets to the access routers AR1, AR2, as shown in FIG. 1C. Furthermore, as shown in FIG. 1D, the mobile terminal MT, after having moved to under the access router AR2, sends a route update packet to a gateway GW. This results in eliminating the path other than the path via the access router AR2 out of those from communication correspondent 30 to the mobile terminal MT.

In Cellular IP, however, when the relay router multicasts packets to the original access router and to the new access router, no consideration is given to the timing when the relay router sends packets into each of the paths, and this poses the following problem.

Figure 2:
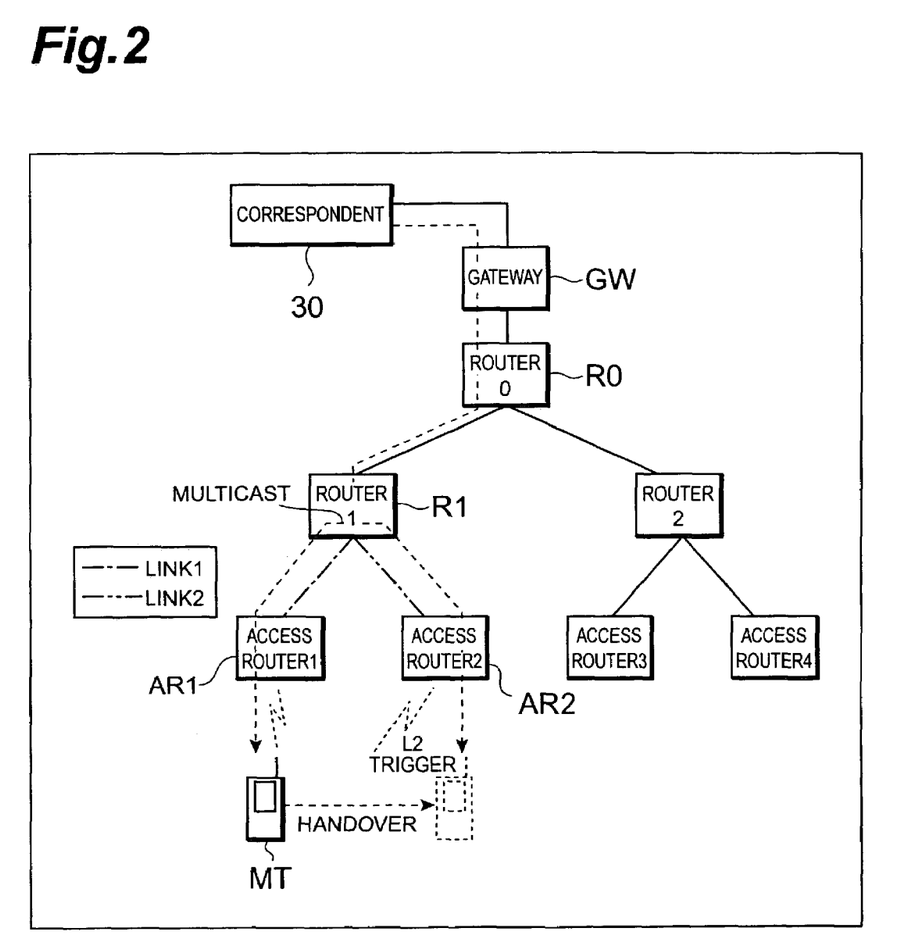
FIG. 2 is an illustration for explaining the problem in Cellular IP.

In the network of FIG. 2, when a transmission delay of link 1 is greater than that of link 2, the mobile terminal MT might receive packets some ahead of already-received packets after completion of handover, so as to be unable to receive packets between them; therefore, it is necessary to perform retransmission in TCP and the TCP throughput will be lowered.

On the other hand, when the transmission delay of link 1 is not more than that of link 2, the mobile terminal MT receives already-received packets after completion of handover. In TCP all packets are given a series of sequence numbers and, when being unable to receive packets of sequence numbers in the given order, instead of returning the sequence numbers, the receiver sends to the sender an ACK of a last packet of those received in the given order of sequence numbers. Concerning the ACK of this packet, since another ACK must have already been sent upon reception of the packet, the packet sent at this stage is a duplicate ACK (D-ACK).

If the number of duplicate ACKs generated by packets received redundantly becomes three or more, the system goes into the Congestion Avoidance phase called Fast Retransmit and Fast Recovery in TCP Reno, TCP New-Reno, TCP SACK, etc. being the TCP algorithms currently used in general, so as to lower the throughput of TCP in some cases. However, as also described in the Draft of Cellular IP, no packet loss occurs in this case and thus the drop of throughput is likely to be less than that in the aforementioned case where the transmission delay of link 1 is greater than that of link 2.

The present invention has been accomplished in order to solve the above problem, and it is a first object of the invention to calculate a deviation of synchronization between multicast packets from a relay router when received by a mobile terminal, and add a delay to correct for the deviation of synchronization calculated for each relay router by the mobile terminal, to each path in multicasting, thereby preventing occurrence of packet loss.

It is a second object of the invention to implement control adapted to the present handover method on the TCP side of the mobile terminal, thereby preventing the drop of TCP throughput due to duplication of packets.

SUMMARY OF THE INVENTION

In order to accomplish the above first object, a packet transmission method according to the present invention is a packet transmission method adapted for a communication system comprising a mobile terminal, a plurality of access routers, each access router forming a cell and configured to perform radio communication with a mobile terminal located in the cell, and a plurality of relay routers connected to a hierarchical structure above the access routers, said packet transmission method being applied when a packet from a packet source is transmitted from an upper layer in the communication system toward a target mobile terminal, the packet transmission method comprising: letting the relay router engaged in relaying the packet from the packet source, multicast a router advertisement with the packet to all access routers forming cells into which the target mobile terminal may move; letting the mobile terminal receive the multicast router advertisements from a plurality of neighbor access routers; letting the mobile terminal calculate a difference between reception times of packets from respective access routers, based on information about reception from the plurality of access routers, and specify a relay router that should perform multicasting; letting the mobile terminal transmit to the specified relay router a multicast message containing delay information of a delay to be added to each path in the multicasting by the relay router; and letting the relay router receive the multicast message from the mobile terminal and add the delay to each path in the multicasting on the basis of the delay information.

The above aspect of the invention related to the packet transmission method can also be described from an aspect of the invention associated with the following communication system. Namely, in order to accomplish the first object, a communication system according to the present invention is a communication system comprising a mobile terminal, a plurality of access routers, each access router forming a cell and configured to perform radio communication with a mobile terminal located in the cell, and a plurality of relay routers connected to a hierarchical structure above the access routers, wherein each of the relay routers comprises: multicasting means for, during relaying performed when a packet from a packet source is transmitted from an upper layer in the communication system toward a target mobile terminal, multicasting a router advertisement with the packet to all access routers forming cells into which the target mobile terminal may move; and delay adding means for receiving a multicast message containing delay information of a delay that the relay router should add to each path in multicasting, from the mobile terminal and adding the delay to each path in the multicasting on the basis of the delay information; and wherein the mobile terminal comprises: receiving means for receiving the multicast router advertisements from a plurality of neighbor access routers; calculating-specifying means for calculating a difference between reception times of packets from respective access routers, based on information about reception from the plurality of access routers, and specifying a relay router that should perform multicasting; and message transmitting means for transmitting a multicast message containing delay information of a delay that the relay router should add to each path in the multicasting, to the specified relay router.

The communication system according to the present invention comprises the mobile terminal, the plurality of access routers, each access router forming a cell and configured to perform radio communication with a mobile terminal located in the cell, and the plurality of relay routers connected to the hierarchical structure above the access routers. The present invention relates to packet transmission carried out in this communication system during an operation in which a packet from a packet source is transmitted from an upper layer in the communication system toward a target mobile terminal.

Namely, when relaying a packet from a packet source, the relay router multicasts the router advertisement with the packet to all access routers forming cells into which the target mobile terminal might move. Then the mobile terminal, having moved into a cell (e.g., having moved across a border between cells), receives the multicast router advertisements from a plurality of neighbor access routers.

At this point, the mobile terminal calculates a difference between reception times of packets from the respective access routers (corresponding to a delay to be added to each path in the multicasting), based on the information about the reception from the plurality of access routers (e.g., timestamps indicating times of reception, or the like), and specifies a relay router that should perform the multicasting. As described, the present invention has the significant feature that the mobile terminal specifies the relay router that should perform multicasting.

Then the mobile terminal sends the multicast message containing the delay information of the delay that the relay router should add to each path in multicasting, to the specified relay router. Then the relay router receives the multicast message from the mobile terminal and adds the delay to each path in the multicasting on the basis of the delay information.

This achieves synchronization of timing for the relay router to send packets into each path, whereby it is feasible to prevent occurrence of packet loss as occurred before.

In order to achieve the above second object, the packet transmission method according to the present invention is preferably configured, so that the mobile terminal performs such control as to avoid sending a response of an acknowledgment of a received packet, under a predetermined condition, on the basis of timestamp information of the received packet and a sequence number of the packet.

In order to achieve the above second object, the communication system according to the present invention is preferably configured, so that the mobile terminal further comprises response avoidance controlling means for performing such control as to avoid sending a response of an acknowledgment of a received packet, under a predetermined condition, on the basis of timestamp information of the received packet and a sequence number of the packet.

Namely, the mobile terminal determines whether the packet is an already-received packet, under the predetermined condition, on the basis of the timestamp information of the received packet and the sequence number of the packet. For example, even in the case where the timestamp of the received packet is not less than a timestamp threshold, the received packet can be determined as an already-received packet if the sequence number of the received packet is not more than a latest sequence number of already-received packets.

By performing such control as to avoid sending the response of the acknowledgment of the received packet, under the condition as described, it is feasible to prevent the drop of TCP throughput due to duplication of packets.

The control of the mobile terminal's avoiding sending the response of the acknowledgment as described above is absolutely one executed only during multicast handover, and communication control based on the TCP is carried out during periods other than it, as a matter of course.

Incidentally, there are also cases where the mobile terminal cannot receive the router advertisements simultaneously from a plurality of neighbor access routers. In such cases, the packet transmission method according to the present invention is preferably configured, so that the access router as a sender of a router advertisement that the mobile terminal can receive, transmits a router advertisement that the mobile terminal cannot receive, as a proxy router advertisement to the mobile terminal.

The communication system according to the present invention is preferably configured, so that each of the access routers comprises proxy advertisement controlling means for, when the mobile terminal cannot receive the router advertisements simultaneously from a plurality of neighbor access routers including the access router itself thereof but can receive a router advertisement from the access router itself, performing such control as to transmit a router advertisement that the mobile terminal cannot receive, as a proxy router advertisement to the mobile terminal.

Even in the case where the mobile terminal cannot receive the router advertisements simultaneously from a plurality of neighbor access routers, as described above, the access router as a sender of the router advertisement that the mobile terminal can receive transmits the router advertisement that the mobile terminal cannot receive, as a proxy router advertisement to the mobile terminal, and then the mobile terminal can receive the router advertisements from a plurality of neighbor access routers, though in indirect manner, whereby the utility of the present invention can be enhanced more.

DESCRIPTION OF THE PREFERRED EMBODIMENTS

An embodiment of the present invention will be described below.

First, a configuration of a relay router performing the operation according to the present invention will be described. The relay router herein is a router that relays packets to access routers (for example, a cross over router (COR)) and in FIG. 5, for example, it corresponds to relay routers R0, R1, R2 (which will be generally called "relay router R").

Figure 3:
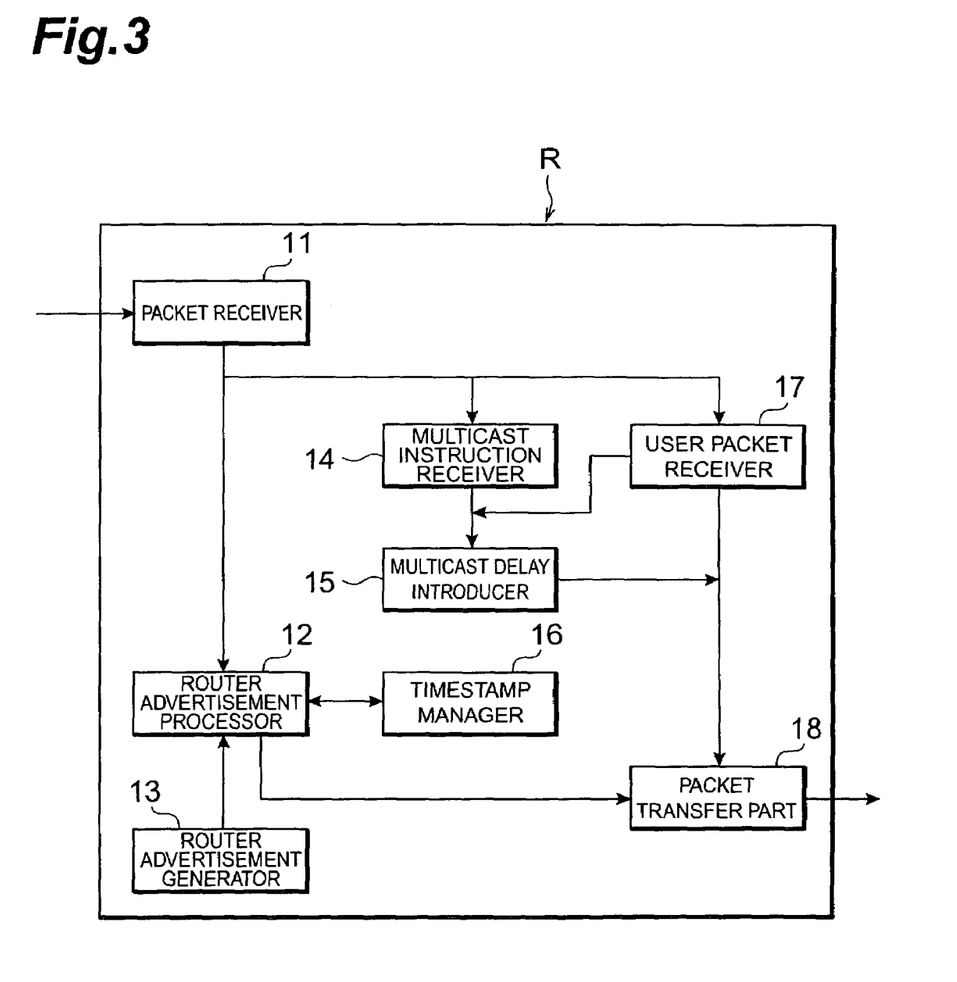
FIG. 3 is a block diagram of the relay router.

As shown in FIG. 3, the relay router R is comprised of a packet receiver 11 configured to evaluate a received packet and transfer it to each processing module; a user packet receiver 17 configured to receive a user packet and process the received packet according to presence or absence of a multicast instruction; a multicast instruction receiver 14 configured to receive a multicast instruction from a mobile terminal; a multicast delay introducer 15 configured to multicast a packet on the basis of the received multicast instruction and add an appropriate delay to each path; a router advertisement generator 13 configured to generate a router advertisement (RA); a timestamp manager 16 configured to manage timestamps; a router advertisement processor 12 configured to add a timestamp and an ID of the relay router managed in the timestamp manager 16, to the router advertisement generated by the router advertisement generator 13; and a packet transfer part 18 configured to transfer a packet to the next node.

The above timestamp can be made, for example, by adopting a CPU clock, the network time protocol (NTP), the GPS (Global Positioning System), a built-in clock, or the like.

The basic operation in the present embodiment will be described below referring to FIG. 5.

(1) The relay router 0 transmits a router advertisement (RA) with a packet from correspondent 30 to the lower routers below it. The router advertisement is given an ID of the transmitting node and a timestamp indicating a transmission time. The ID of the node herein can be, for example, one such as an IP Address, an FQDN (Fully Qualified Domain Name), or the like.

(2) Each of the relay routers R1, R2, receiving the router advertisement, adds an ID of its own and a timestamp indicating a reception time to the received router advertisement.

(3) Similar processing is carried out at access routers serving as lowest relay nodes.

(4) The mobile terminal MT, receiving such router advertisements, refers to entries in the router advertisements and calculates propagation delays of multicast packets from their first identical entries.

Figure 5:
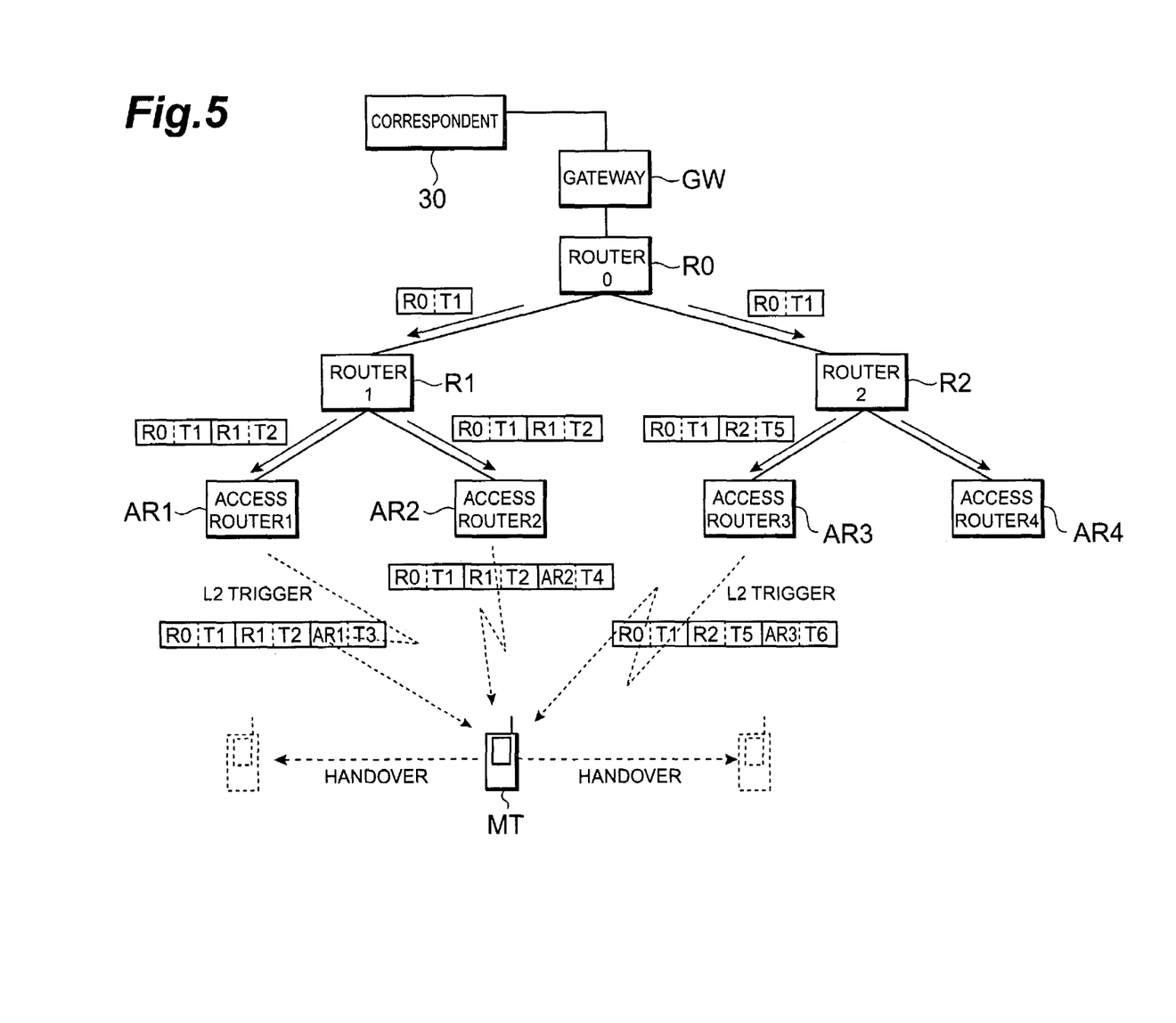
FIG. 5 is an illustration for explaining the basic operation in the embodiment of the invention.

In FIG. 5, the first matching portions are the entries of "R1, T2," and the difference (diff1-1) between the timestamp and the time of reception of the router advertisement from the access router AR1 and the difference (diff1-2) between the timestamp and the time of reception of the router advertisement from the access router AR2 are calculated as propagation delays of the packets having traveled through the respective paths.

(5) Synchronization of the packets arriving at the mobile terminal MT in the multicasting case is achieved by making use of the propagation delays calculated above. Specifically, (diff1-1 +handover transaction delay) is compared with diff1-2, and the following processing is carried out according to the result of the comparison.

Namely, when (diff1-1 +handover transaction delay) is smaller than diff1-2, the delay of (diff1-2 −(diff1-1 +handover transaction delay)) is added to the path routed via the access router AR1, on the occasion of multicasting at the relay router R1.

On the other hand, when (diff1-1 +handover transaction delay) is greater than diff1-2, the delay of ((diff1-1 +handover transaction delay)−diff1-2) is added to the path routed via the access router AR2, on the occasion of multicasting at the relay router R1.

(6) Then the next matching entries are those of "R0, T1." However, since the relay router R1 has already added the delay on the basis of the router advertisements via the access routers AR1, AR2, it is necessary to take the above-added delay into consideration when the router advertisement via the access router AR3 is compared with the router advertisement via the access router AR1 or AR2. The example below will be described by letting delay0, be the delay added at the relay router R1 to the path via the access router AR2.

(7) Propagation delays diff0-2, diff0-3, through the paths from the relay router R0 via the respective access routers are calculated, in much the same manner as above, from the times of reception of the router advertisements and the timestamps in the respective router advertisements. It is necessary herein to add delay0, to diff0-2. In the description below, the case of adding delay0, to diff0-2, will be described by letting diff0-2 (delay0) be the new propagation delay.

(8) Synchronization of the packets arriving at the mobile terminal MT in the multicasting case is achieved by making use of the propagation delays calculated above. Specifically, diff0-2 (delay0) is compared with diff0-3, and the following processing is carried out according to the result of the comparison.

Namely, when diff0-2 (delay0) is smaller than diff0-3, the delay of (diff0-3 −diff0-2 (delay0)) is added to the paths routed via the access routers AR1, AR2, on the occasion of multicasting at the relay router R0.

On the other hand, when diff0-2 (delay0) is greater than diff0-3, the delay of (diff0-2 (delay0) −diff0-3) is added to the path routed via the access router AR3, on the occasion of multicasting at the relay router R0.

Figure 6:
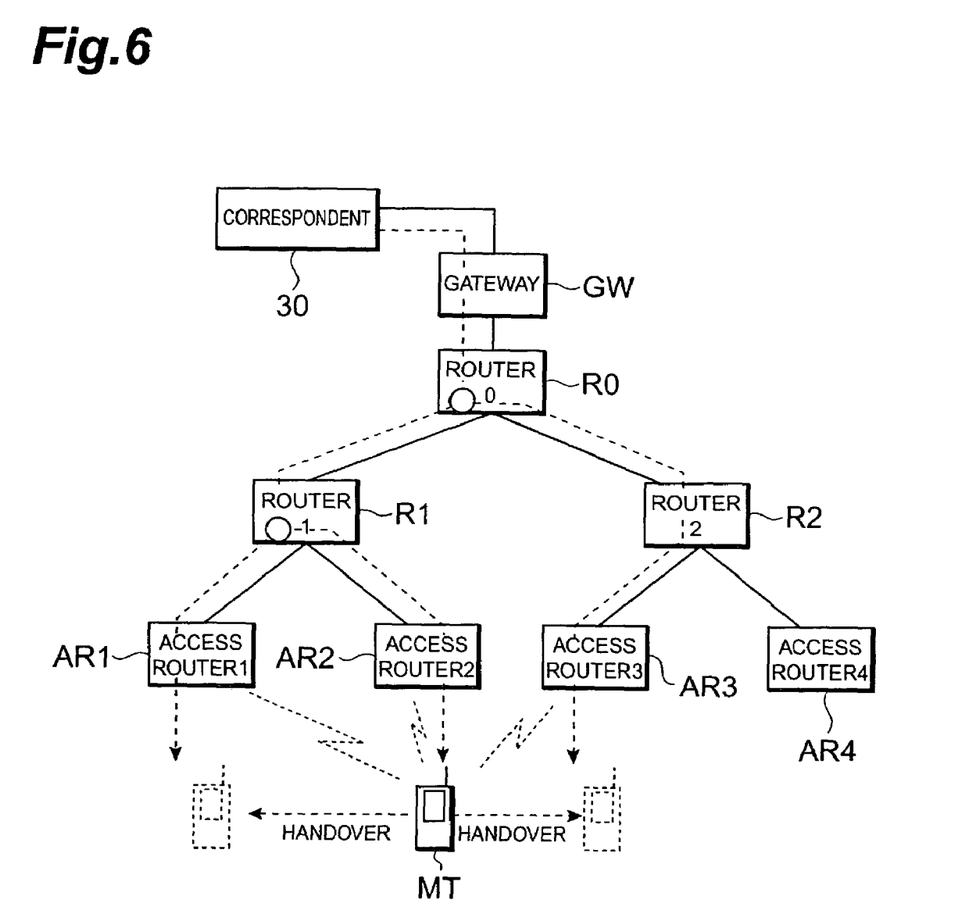
FIG. 6 is an illustration showing the operation wherein the delay is added to the appropriate path at each multicast point by the basic operation in the embodiment of the invention.

As a result of the processing as described above, the appropriate delay is added to the appropriate path at each multicast point shown in FIG. 6, whereby it becomes feasible to control the reception interval of packets received at the mobile terminal. The above method can also be applied to configurations with increase in the number of steps in the topology shown in FIG. 6, by repeating similar operation.

The handover transaction delay described above is preferably a maximum of measured handover transaction delays in view of prevention of packet loss.

Figure 9:
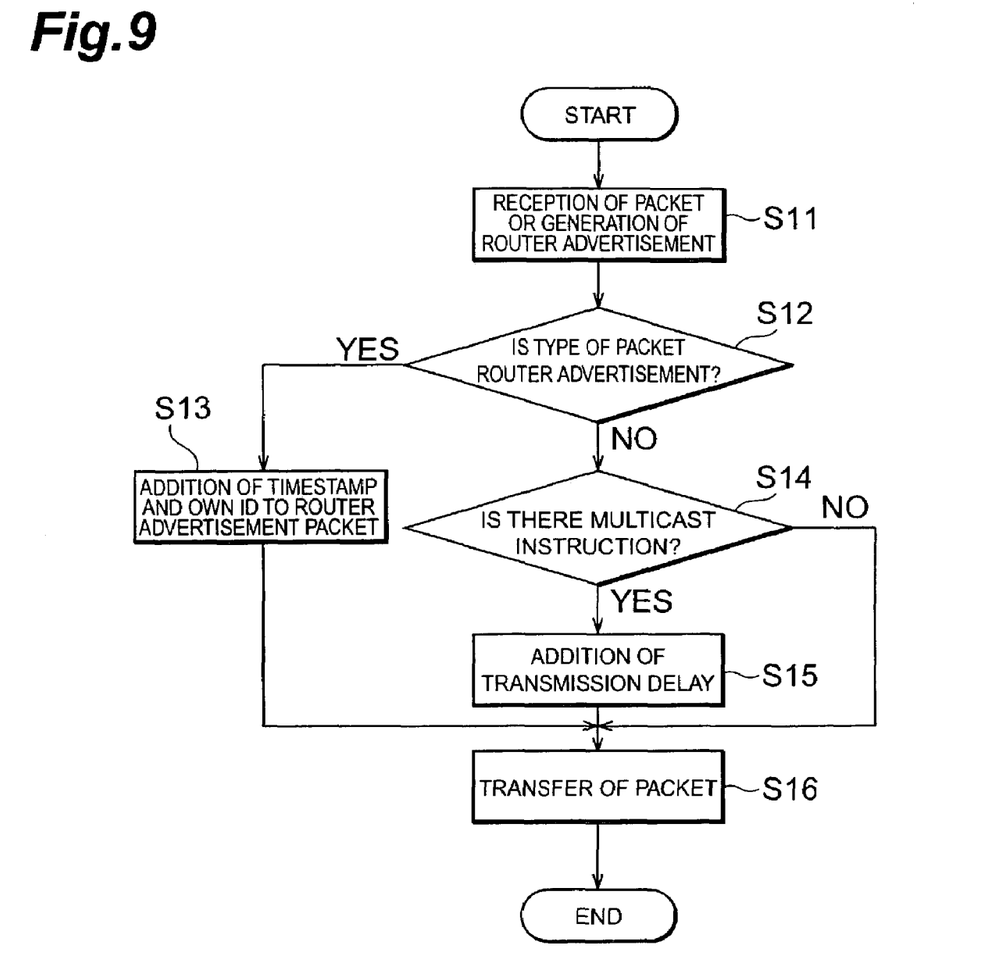
FIG. 9 is a flowchart showing the operation of the relay router.

The operation of the relay router R of FIG. 3 will be described below according to the flowchart shown in FIG. 9.

First, the packet receiver 11 receives a packet, or if the relay router R is the relay router 0, the router advertisement generator 13 generates a router advertisement (S11). Then the packet receiver 11 or the router advertisement generator 13 determines whether the type of the packet received or generated is a router advertisement (S12).

When the type of the packet is a router advertisement herein, the router advertisement processor 12 adds a timestamp managed by the timestamp manager 16, and an ID of its own to the router advertisement packet and sends the added packet to the packet transfer part 18 (S13).

On the other hand, when the type of the packet is not a router advertisement but a user packet, the user packet receiver 17 determines whether there is a multicast instruction (S14). When it is determined herein that there is a multicast instruction, the packet is sent to the multicast delay introducer 15, and the multicast delay introducer 15 gives a transmission delay to the packet to be transferred into each path, based on the transmission delay calculated by the mobile terminal, and then sends the packet to the packet transfer part 18 (S15).

When it is determined in S14 that there is no multicast instruction (in the case of a negative judgment in S14), the packet is sent to the packet transfer part 18 as it is.

In S16 the packet transfer part 18 then transfers the received packet immediately to the next address.

Incidentally, the mobile terminal might redundantly receive an already-received packet in the above case. Then this problem is solved by adding a new function to the terminal side as described below, so as to solve the problem of the drop of TCP throughput occurring on the occasion of duplicate reception of packets.

Namely, in the present embodiment, the mobile terminal is provided with a function of first letting the mobile terminal compare a received packet with thresholds at the time of reception, thereby enabling elimination of a duplicate packet. The thresholds are those for the timestamp and sequence number.

Figure 4:
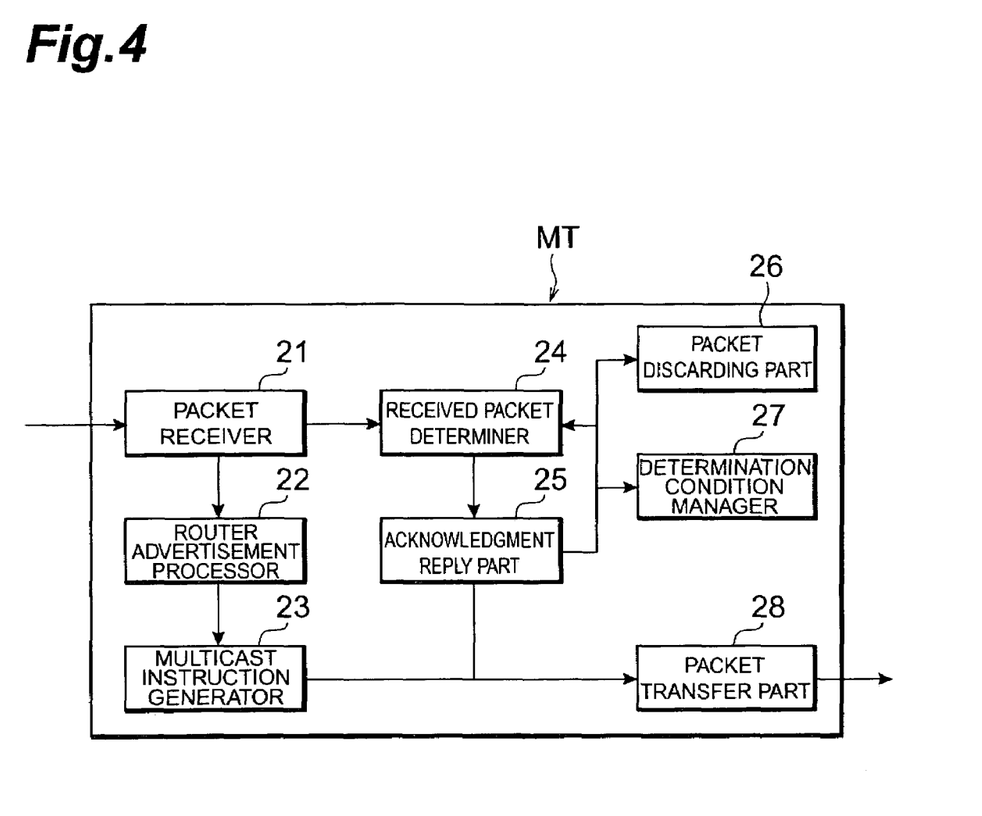
FIG. 4 is a block diagram of the mobile terminal.

First, a configuration of the mobile terminal MT will be described referring to FIG. 4. As shown in FIG. 4, the mobile terminal MT is comprised of a packet receiver 21 configured to receive a packet from the transmitter side; a determination condition manager 27 configured to manage the threshold about the timestamp (timestamp threshold) and the threshold about the sequence number (sequence number threshold) as criteria of determination described later and update the timestamp threshold and sequence number threshold under a predetermined condition described later; a received packet determiner 24 configured to compare the timestamp and sequence number of the received packet with the thresholds managed by the determination condition manager 27; an acknowledgment reply sender 25 configured to send an ACK to the transmitter side when the timestamp of the received packet is not less than the threshold and when the sequence number is greater than the threshold; a packet discarding part 26 configured to discard the received packet when the timestamp of the received packet is smaller than the threshold and when the sequence number is not more than the threshold; a router advertisement processor 22 configured to calculate the delay at each multicasting router on the basis of handover transaction delays continuously measured and router advertisements received from respective access routers; a multicast instruction generator 23 configured to generate a multicast instruction to each multicasting router; and a packet transfer part 28 configured to transfer a packet to each target node.

The router advertisement processor 22, multicast instruction generator 23, and packet transfer part 28 among the above components are intended to generate the multicast instruction, and the setup of these components can also be added to the access router side facing the mobile terminal MT, without having to be limited to the mobile terminal MT.

Figure 7:
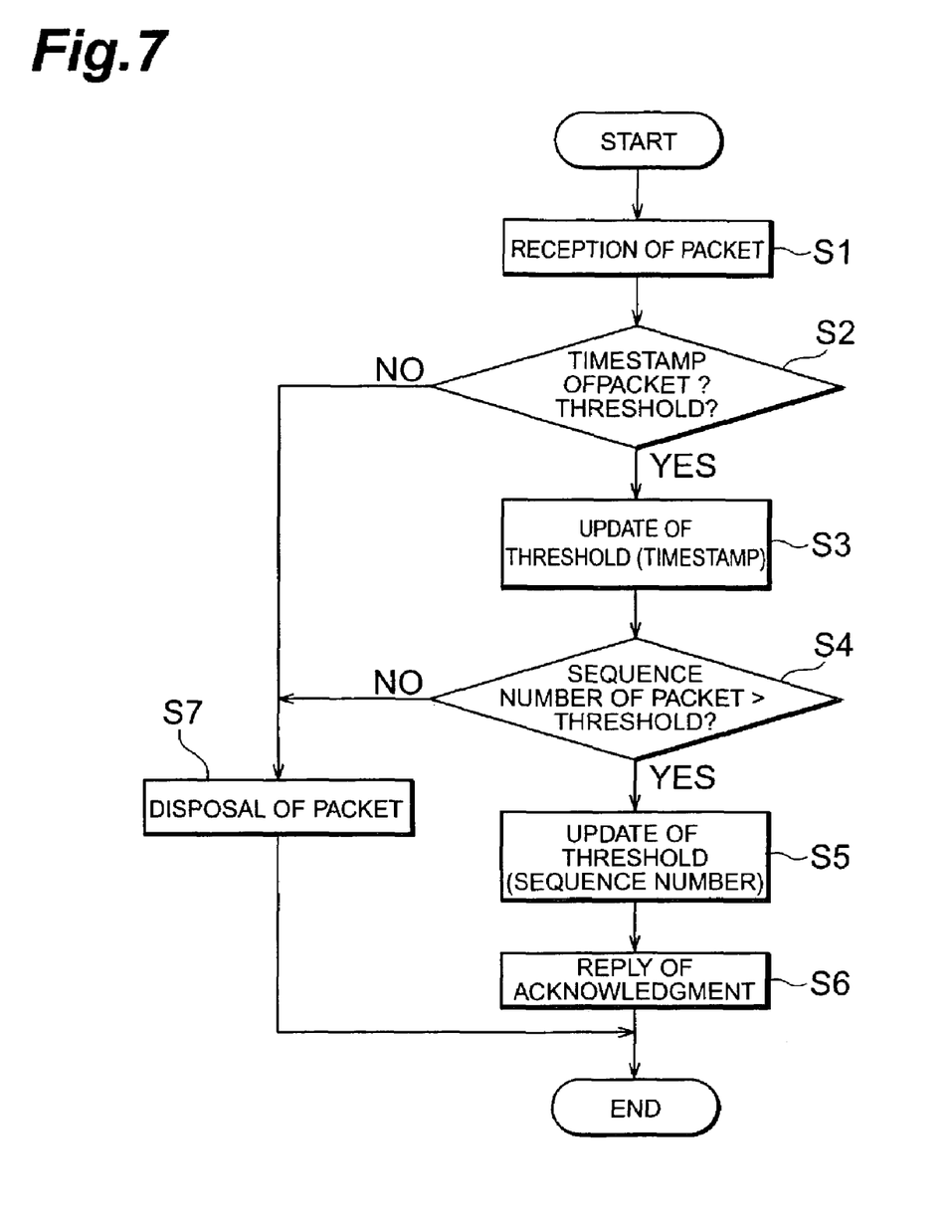
FIG. 7 is a flowchart showing the operation of the mobile terminal.

The operation of the mobile terminal MT of FIG. 4 will be described below according to the flowchart shown in FIG. 7.

First, the packet receiver 21 receives a packet from the transmitter side (S1), and the received packet determiner 24 determines whether the timestamp of the received packet is not less than (i.e., greater than or equal to) the timestamp threshold managed by the determination condition manager 27 (S2).

When the timestamp of the received packet is not less than the threshold, the determination condition manager 27 updates the timestamp threshold to the timestamp of the received packet (S3), and the received packet determiner 24 determines whether the sequence number of the received packet is greater than the sequence number threshold managed by the determination condition manager 27 (S4).

When the sequence number of the received packet is greater than the threshold, the determination condition manager 27 updates the sequence number threshold to the sequence number of an ACK to the sender (S5); then the received packet is processed according to the normal operation of TCP and the acknowledgment reply sender 25 sends the ACK to the transmitter side (S6).

On the other hand, in either of the case where the timestamp of the received packet is smaller than the threshold in S2 and the case where the sequence number of the received packet is not more than (equal to or smaller than) the threshold in S4, the received packet is a duplicate packet and the packet discarding part 26 thus discards the received packet (S7).

In addition to the above operation, the mobile terminal MT performs the following operation for the purpose of generating the multicast instruction. Namely, the router advertisement processor 22 calculates the delay at each multicasting router on the basis of the handover transaction delays continuously measured and the router advertisements received from the respective access routers, and the multicast instruction generator 23 generates the multicast instruction to each multicasting router. The packet transfer part 28 transfers the packet to each target rode.

For executing the above processing, the mobile terminal MT needs to receive router advertisements from a plurality of neighbor access routers, and there are thus restrictions on the wireless scheme thereof. However, a frequency for signals is prepared in the presently existing mobile communications, and the mobile terminal can receive broadcast information from a plurality of access routers by making use of this frequency.

Incidentally, if the mobile terminal MT cannot receive router advertisements simultaneously from the neighbor access routers, the processing method according to the present invention can be implemented by letting an access router presently under communication forward the router advertisement from each neighbor access router as a proxy router advertisement (Proxy RA (PRA)).

The processing method will be described below with FIG. 8 in the case where the mobile terminal MT cannot receive the router advertisements simultaneously from the neighbor access routers.

(1) The relay router 0 transmits a router advertisement (RA) with a packet from correspondent 30 to the lower routers below it. The router advertisement is given an ID of the transmitting node and a timestamp indicating the transmission time. The ID of the node herein can be, for example, one such as an IP Address, an FQDN (Fully Qualified Domain Name), or the like.

(2) Each of the relay routers R1, R2, receiving the router advertisement, adds an ID of its own and a timestamp indicating a reception time to the received router advertisement.

(3) Similar processing is also carried out at the access routers as the lowest relay nodes to transfer the router advertisement to access routers under control and also multicast the router advertisement to neighbor access routers.

(4) The access router AR2 communicable with the mobile terminal MT forwards the router advertisements from the neighbor access routers AR1, AR3, as proxy router advertisements to the mobile terminal MT. On that occasion the access router adds an RTT (Round Trip Time) between the access router AR1 or AR3 having transmitted the router advertisement as the origin of the proxy advertisement and the access router AR2 having transmitted the proxy advertisement. The RTT added herein is determined, for example, as follows.

When the timestamps are synchronized between the access routers, the difference between the timestamp attached upon multicasting of the router advertisement and the reception time is defined as the RTT.

When the timestamps are not synchronized between the access routers, the value of RTT is measured by making use of messages (e.g., PING of ICMP) or the like sent for periodically measuring the RTT between the access routers, and the measured value is added.

Figure 8:
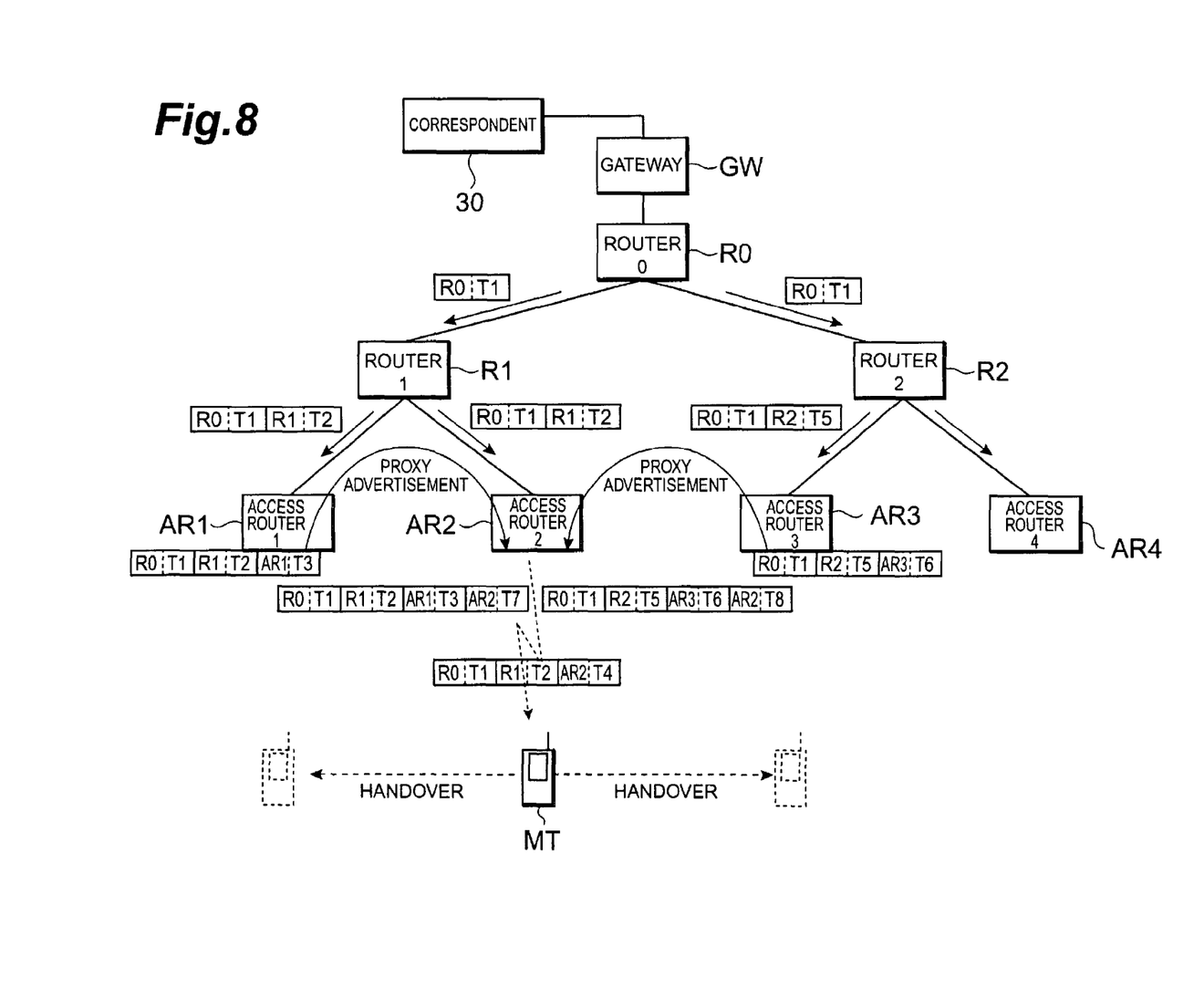
FIG. 8 is an illustration for explaining the processing method where the mobile terminal cannot receive the router advertisements simultaneously from the neighbor access routers.

In FIG. 8, the first matching portions are the entries of "R1, T2," and the value (diff1-1) resulting from subtraction of the RTT between the access router AR1 and the access router AR2 from the difference between the timestamp of the matching entries and the reception time of the router advertisement from the access router AR1, and the difference (diff1-2) between the above timestamp and the reception time of the router advertisement from the access router AR2, are the propagation delays of the packets having traveled through the respective paths.

Each of the proxy advertisement for the access router AR1 and the proxy advertisement for the access router AR3, transmitted by the access router AR2, includes a time for being forwarded from each of the access routers AR1, AR3 to the access router AR2. For this reason, as to the proxy advertisement (PRA), it is necessary to take account of the RTT separately measured at the time of exchange of a proxy advertisement request and the proxy advertisement.

(5) The packets arriving at the mobile terminal MT in the multicasting case are synchronized by making use of the propagation delay calculated above. Specifically, (diff1-1 +handover transaction delay) is compared with diff1-2, and the following processing is carried out according to the result of the comparison.

Namely, when (diff1-1 +handover transaction delay) is smaller than diff1-2, the delay of (diff1-2 −(diff1-1 +handover transaction delay)) is added to the path routed via the access router AR1, on the occasion of multicasting at the relay router R1.

On the other hand, when (diff1-1 +handover transaction delay) is greater than diff1-2, the delay of ((diff1-1 +handover transaction delay)−diff1-2) is added to the path routed via the access router AR2, on the occasion of multicasting at the relay router R1.

(6) Then the next matching entries are those of "R0, T1." However, since the delay has already been added at the relay router R1 on the basis of the router advertisements via the access routers AR1, AR2, it is necessary to give consideration to the delay added above, when the router advertisement via the access router AR3 is compared with the router advertisement via the access router AR1 or AR2. The example below will be described by letting delay0, be the delay added at the relay router R1 to the path via the access router AR2.

(7) The propagation delays diff0-2, diff0-3, through the paths from the relay router R0 via the respective access routers are calculated, in much the same manner as above, from the reception times of the router advertisements and the timestamps in the respective router advertisements. It is noted herein that delay0 should be added to diff0-2. In the description hereinafter, the case of addition of delay0, to diff0-2, will be described by defining diff0-2 (delay0) as a new propagation delay.

(8) The packets arriving at the mobile terminal MT in the multicasting case are synchronized by making use of the propagation delay calculated above. Specifically, diff0-2 (delay0) is compared with diff0-3, and the following processing is carried out according to the result of the comparison.

Namely, when diff0-2 (delay0) is smaller than diff0-3, the delay of (diff0-3 −diff0-2 (delay0)) is added to the paths routed via the access routers AR1, AR2, on the occasion of multicasting at the relay router R0.

On the other hand, when diff0-2 (delay0) is greater than diff0-3, the delay of (diff0-2 (delay0)−diff0-3) is added to the path routed via the access router AR3, on the occasion of multicasting at the relay router R0.

The execution of the processing method described above can solve the problem of the drop of TCP throughput due to packet loss during handover.

Since the present method can also be implemented without any change in servers typified by existing WWWs, it provides the significant advantage of easy introduction.

In FIGS. 5 and 8 used in the above description, in order to describe the embodiments of multicasting from the relay router R0 to the lower layer, only "R0, T1 " is described in the packet from the relay router R0 to the relay router R1. However, the packet in practice can also be provided with data "CN, T0 " added by the correspondent 30 and, if the communication route from the correspondent 30 is branched, reference is also made to the data "CN, T0 " added by the correspondent 30.

As described above, the present invention made it feasible to prevent the occurrence of packet loss and to prevent the drop of TCP throughput due to duplication of packets, by carrying out the control based on the present handover method on the TCP side of the mobile terminal.

What is claimed is:

1. A packet transmission method adapted for a communication system comprising a mobile terminal, a plurality of access routers, each access router forming a cell and configured to perform radio communication with a mobile terminal located in the cell, and a plurality of relay routers connected to a hierarchical structure above the access routers, said packet transmission method being applied when a packet from a packet source is transmitted from an upper layer in the communication system toward a target mobile terminal, said packet transmission method comprising:
    letting the relay router engaged in relaying the packet from the packet source, multicast a router advertisement with said packet to all access routers forming cells into which said target mobile terminal may move;
    letting said mobile terminal receive multicast router advertisements from a plurality of neighbor access routers;
    letting said mobile terminal calculate a difference between reception times of packets from respective access routers, based on information about reception from the plurality of access routers, and specify a relay router that should perform multicasting;
    letting said mobile terminal transmit to said specified relay router a multicast message containing delay information of a delay to be added to each path in the multicasting by the relay router; and
    letting said relay router receive the multicast message from the mobile terminal and add the delay to each path in the multicasting on the basis of the delay information.

2. The packet transmission method according to claim 1, wherein said mobile terminal performs such control as to avoid sending a response of an acknowledgment of a received packet, under a predetermined condition, on the basis of timestamp information of the received packet and a sequence number of the packet.

3. The packet transmission method according to claim 1, wherein when said mobile terminal cannot receive the router advertisements simultaneously from a plurality of neighbor access routers, another access router as a sender of a router advertisement that said mobile terminal can receive, transmits a replacement router advertisement that said mobile terminal could not otherwise receive from the plurality of neighbor access routers, as a proxy router advertisement to the mobile terminal.

4. A communication system comprising a mobile terminal, a plurality of access routers, each access router forming a cell and configured to perform radio communication with a mobile terminal located in the cell, and a plurality of relay routers connected to a hierarchical structure above the access routers,
    wherein each of the relay routers comprises:
        multicasting means for, during relaying performed when a packet from a packet source is transmitted from an upper layer in the communication system toward a target mobile terminal, multicasting a router advertisement with said packet to all access routers forming cells into which the target mobile terminal may move; and
        delay adding means for receiving a multicast message containing delay information of a delay that the relay router should add to each path in multicasting, from the mobile terminal and adding the delay to each path in the multicasting on the basis of the delay information; and
    wherein the mobile terminal comprises:
        receiving means for receiving the multicast router advertisements from a plurality of neighbor access routers;
        calculating-specifying means for calculating a difference between reception times of packets from respective access routers, based on information about reception from the plurality of access routers, and specifying a relay router that should perform multicasting; and
        message transmitting means for transmitting a multicast message containing delay information of a delay that the relay router should add to each path in the multicasting, to the specified relay router.

5. The communication system according to claim 4, wherein the mobile terminal further comprises response avoidance controlling means for performing such control as to avoid sending a response of an acknowledgment of a received packet, under a predetermined condition, on the basis of timestamp information of the received packet and a sequence number of the packet.

6. The communication system according to claim 4, wherein each of the access routers comprises proxy advertisement controlling means for, when the mobile terminal cannot receive the router advertisements simultaneously from a plurality of neighbor access routers but can receive a router advertisement from another access router, performing such control so as to transmit a replacement router advertisement that the mobile terminal could not receive from the plurality of neighbor access routers, as a proxy router advertisement to the mobile terminal.

* * * * *